United States Patent
Liang et al.

(10) Patent No.: US 7,124,720 B2
(45) Date of Patent: Oct. 24, 2006

(54) PERMANENT MAGNET ELECTROMAGNETIC ACTUATOR FOR AN ELECTRONIC VALVE ACTUATION SYSTEM OF AN ENGINE

(75) Inventors: Feng Liang, Canton, MI (US); Michael Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/811,085

(22) Filed: Mar. 25, 2004

(65) Prior Publication Data

US 2005/0211199 A1  Sep. 29, 2005

(51) Int. Cl.
F01L 9/04 (2006.01)

(52) U.S. Cl. ............... 123/90.11; 123/90.24; 251/129.07; 251/129.09; 251/129.15; 251/129.16; 335/229; 335/302

(58) Field of Classification Search ............. 123/90.11, 123/90.24; 251/129.07, 129.09, 129.1, 129.15, 251/129.16; 335/227, 229, 255, 256, 266, 335/268, 295, 302, 304, 306; 336/110; 310/152, 310/154.01, 154.32, 156.01
See application file for complete search history.

(56) References Cited

U.S. PATENT DOCUMENTS

| | | | |
|---|---|---|---|
| 4,152,570 A | * | 5/1979 | Inoue et al. ............... 219/69.2 |
| 4,779,582 A | | 10/1988 | Lequesne |
| 4,829,947 A | | 5/1989 | Lequesne |
| 6,047,672 A | * | 4/2000 | Hanai et al. ............. 123/90.11 |
| 6,615,780 B1 | * | 9/2003 | Lin et al. .................. 123/90.17 |
| 6,684,829 B1 | * | 2/2004 | Gebauer et al. ......... 123/90.11 |
| 6,717,297 B1 | * | 4/2004 | Sadarangani et al. ......... 310/14 |
| 6,763,789 B1 | | 7/2004 | Liang et al. |

FOREIGN PATENT DOCUMENTS

| | | | |
|---|---|---|---|
| EP | 1174595 A1 | * | 1/2002 |
| FR | 2812024 | | 1/2002 |
| FR | 2812025 | | 1/2002 |
| FR | 2820238 | | 2/2002 |
| JP | 2002/130510 | | 5/2002 |

* cited by examiner

Primary Examiner—Thomas Denion
Assistant Examiner—Kyle M. Riddle
(74) Attorney, Agent, or Firm—Allan J. Lippa; Alleman Hall McCoy Russell & Tuttle LLP

(57) ABSTRACT

A valve actuator for an internal combustion engine is described having a core having a wound coil located therein, said core further having at least one permanent magnet located at least partially inside said coil and positioned at an angle relative to a direction of movement of an armature.

18 Claims, 5 Drawing Sheets

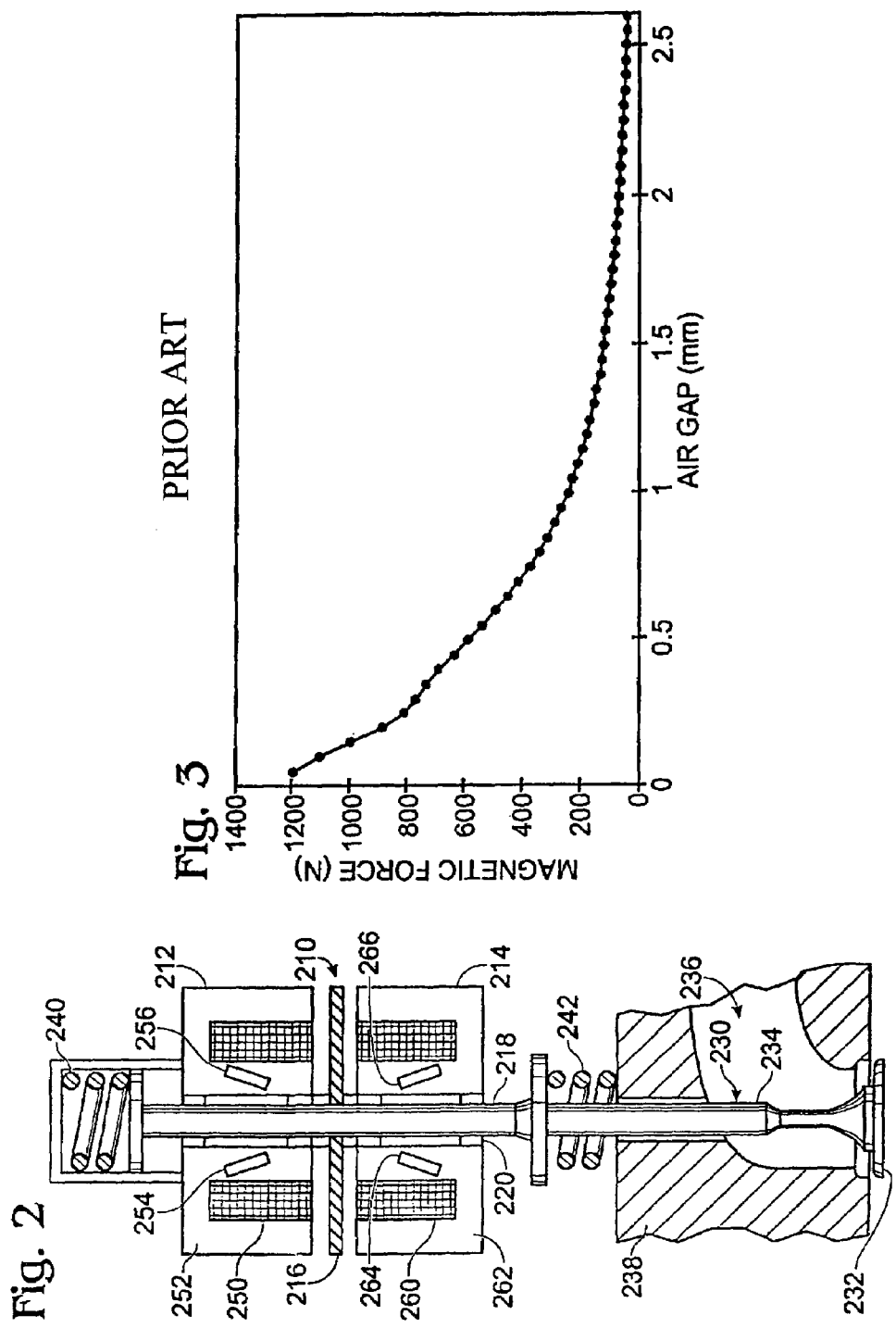

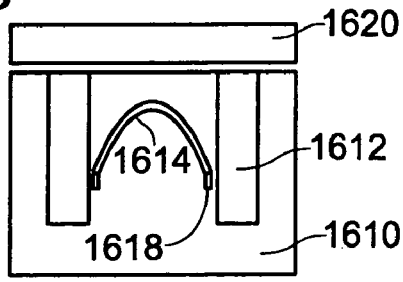
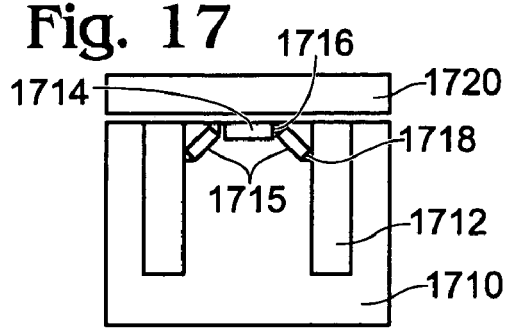
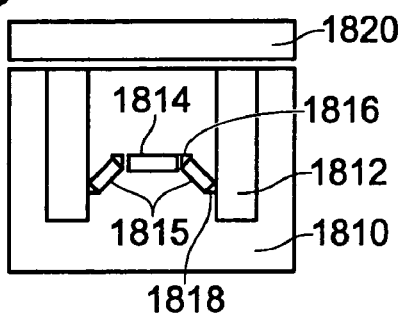
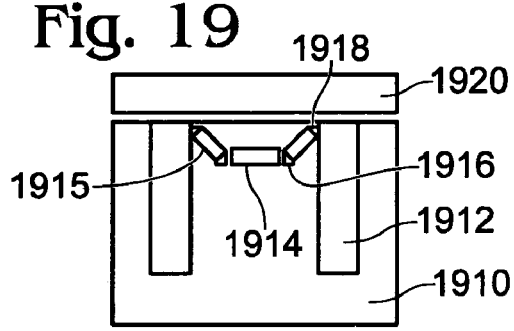
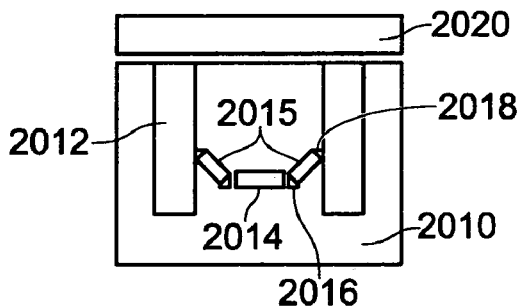
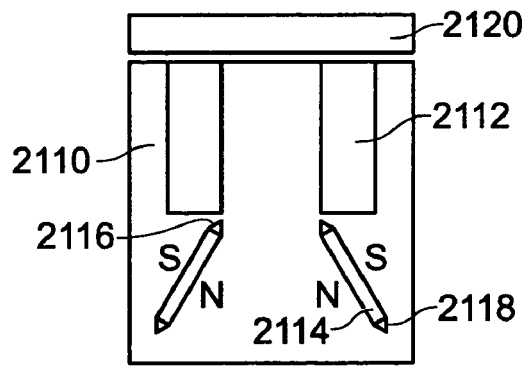
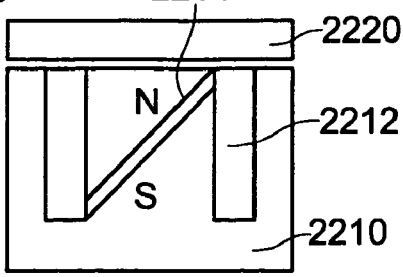
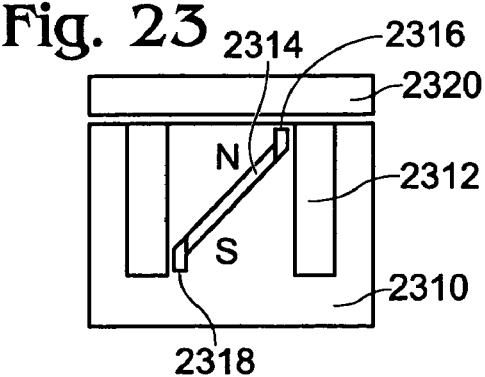

PERMANENT MAGNET ELECTROMAGNETIC ACTUATOR FOR AN ELECTRONIC VALVE ACTUATION SYSTEM OF AN ENGINE

FIELD

The field of the disclosure relates to electromechanical actuators coupled to cylinder valves of an internal combustion engine, and more particularly to a dual coil valve actuator.

BACKGROUND AND SUMMARY

Electromechanical valve actuators for actuating cylinder valves of an engine have several system characteristics to overcome. First, valve landing during opening and closing of the valve can create noise and wear. Therefore, valve landing control is desired to reduce contact forces and thereby decrease wear and noise. However, in some prior art actuators, the rate of change of actuator magnetic force between an armature and a core with respect to changes in the airgap length (dF/dx) can be high when the air gap is small (e.g., at landing). As such, it can be difficult to accurately control the armature and/or seat landing velocity.

Second, opening and closing time of the valve can be greater than a desired value, e.g., 3 msec. In other words, due to limited force producing capability, the transition time of some previous systems may be too slow, and therefore result in reduced engine peak power.

Third, the power consumption of an electric valve actuation (EVA) system can have an impact on vehicle fuel economy, engine peak power, and the size/cost of the electrical power supply system. Therefore, reducing power consumption of the actuator, without sacrificing performance, can be advantageous.

One approach for designing a electromechanical valve actuator of an engine with a permanent magnet is described in JP 2002130510A. Various figures show what appears to be a permanent magnet located below coils having an adjacent air gap. The objective of this reference appears to be to increase the flux density in the core poles by making the permanent magnet width ("Wm" in FIG. 4) wider than the center pole width ("Di" in FIG. 4). The air gaps 39 by the two sides of the permanent magnet appear to be introduced to limit the leakage flux. Apparently, to further increase the flux density in the core pole, the permanent magnet cross section shape is changed from flat to V-shaped in FIG. 9.

Such a configuration therefore results in the bottom part of the center pole (Wm) being wider than the top part (Di) to accommodate the permanent magnet, which is placed below the coil. The inventors herein have recognized that these two features give rise to several disadvantages.

As a first example, such a configuration can result in increased coil resistance or actuator height requirements. In other words, to provide space for the permanent magnet, either the height of the actuator is increased (to compensate the loss of the space for the coil), or the resistance of the coil is higher if the height of the core is kept constant.

As a second example, the flux enhancing effect may also be limited by actuator height. In other words, the amount of space below the coils available for the permanent magnet is limited due to packaging constraints, for example. Therefore, while some flux enhancement may be possible, it comes at a cost of (as is limited by) height restrictions.

Still another potential disadvantage with the approach of JP 2002130510A is that it can be more difficult to manufacture due to the peak of the V in FIG. 9.

Other attempts have also been made to improve the actuator performance by using a permanent magnet. For example, U.S. Pat. No. 4,779,582 describes one such actuator. However, the inventors herein have also recognized that while such an approach may produce a low dF/dx, it still produces low magnetic force due to the magnetic strength limit of the permanent magnet material. Alternatively, other approaches, such as in U.S. application Ser. No. 10/249,328, assigned to the assignee of the present invention, may increase the magnetic force, but may not reduce the dF/dx for armature and valve landing speed control.

In one example, the above disadvantages can be at least partially overcome by a valve actuator for an internal combustion engine, comprising: at least one electromagnet having a coil wound about a core; an armature fixed to an armature shaft extending axially through the core, and axially movable relative thereto; and at least one permanent magnet extending at least partially into an interior portion of the coil.

In this way, there is increased space for the permanent magnet (between the coils), and the actuator height is not required to be increased (although it can be, if desired). Additionally, since coil space is not necessarily reduced; increased coil resistance can be avoided or reduced.

In one specific example, such an approach can be used so that the area of the permanent magnet surface contacting the core is larger than the center pole area facing the armature. As a result, the flux density in the center pole surface may be significantly higher than the flux density in the permanent magnet material's surface, which is limited by the permanent magnet material property. Further, since the magnetic force is proportional to the square of the flux density, this embodiment can increase (significantly in some examples) the force, without necessarily increasing the size of the actuator. And since the permanent magnet is in the path of the flux produced by the current, in one example, the actuator can have a low dF/dx and dF/di (rate of change of force with respect to changes in current), which can be beneficial for landing speed control.

As such, various advantages can be achieved in some cases, such as decreased resistance, decreased height requirements, and increased force output, while maintaining reduced dF/dx and dF/di (which can help valve landing control).

In another example embodiment, the valve actuator can comprise a core having a wound coil located therein, said core further having at least one permanent magnet located at least partially below said coil and positioned at an angle relative to a direction of movement of an armature, with an inner part of said permanent magnet being located closer to said coil than an outer part of said permanent magnet, where said inner part of said permanent magnet is closer to a center of said core than said outer part of said permanent magnet. Further, the valve actuator can further comprise a first gap at said inner part of said permanent magnet and a second gap at said outer part of said permanent magnet.

By having such a configuration, it is also possible to obtain improved actuator force performance, while reducing coil resistance and improving valve manufacturability. Further, in some examples using gaps near selected areas of the permanent magnet, flux leakage can be reduced.

The above advantages and other advantages and features will be readily apparent from the following detailed description or from the accompanying drawings, taken alone or in combination.

BRIEF DESCRIPTION OF THE DRAWINGS

The advantages described herein will be more fully understood by reading an example of an embodiment, referred to herein as the Description of Example Embodiments, with reference to the drawings wherein:

FIG. 2 is a cross-section illustrating one embodiment of a valve actuator assembly for an intake or exhaust valve of an internal combustion engine;

FIG. 3 is a graph showing magnetic force of an actuator as a function of the air gap for a prior art system;

FIGS. 6–23 are cross-sections of alternative embodiments of a valve actuator.

DESCRIPTION OF EXAMPLE EMBODIMENTS

Figure 1:
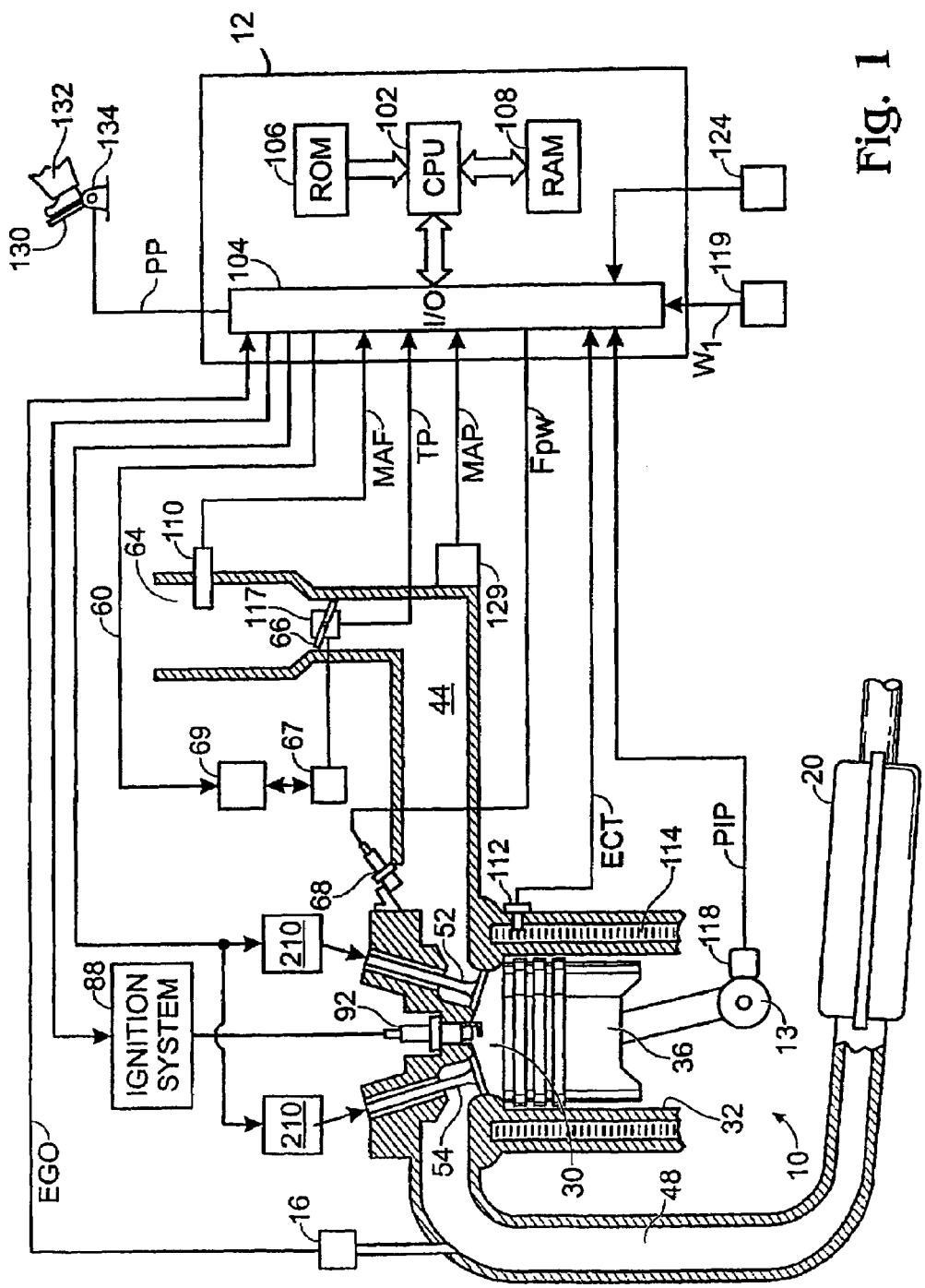
FIG. 1 is a block diagram of an engine illustrating various components.

This disclosure outlines an electromagnetic actuator that can provide advantageous operation, especially when used to actuate a valve of an internal combustion engine, as shown by FIGS. 1–2. This improved actuator may result in a lower cost and lower component requirements, while maintaining desired functionality.

As a general background, several of the hurdles facing electromechanical actuators for valves of an engine are described.

A first example issue relates to engine noise and valve durability. For every two engine crank-shaft revolutions the armature of the EVA actuator of each engine valve "lands" on the upper and lower core once, the armature stem lands on the valve stem once, and the valve lands on the valve seat once (4 impacts). To meet the engine noise targets, the landing speeds of the armature and valve are controlled so as not to exceed a certain level. However, due to the fact that the rate of change of the actuator magnetic force between the armature and the core with respect to changes in the airgap length (dF/dx) is high when the air gap is small, as shown in FIG. 3 for prior art approaches, it can be difficult to control the armature and seat landing velocity. As a result, some EVA systems can have increased noise unless a complicated control algorithm is implemented. Another issue caused by the high armature and valve landing speed relates to valve durability. Because the EVA actuators undergo millions of cycles in the life of the vehicle, high armature and valve landing speed may lead to shortened EVA life.

A second example issue relates to transition time of valve opening/closing. In some situations, to meet the engine peak power requirements particularly at high engine speed, the transition time of the valve opening and closing should be less than a certain value (e.g., ~3 msec). Due to some prior art actuator's limited force producing capability, the transition times may not meet these target opening and closing times. As a result, engines equipped with EVA may produce less peak power than an engine with conventional camshaft operated valves.

A third example issue relates to power consumption of the EVA system. The power consumption of the EVA system directly impacts vehicle fuel economy, engine peak power, and the size/cost of the electrical power supply system. It is therefore desired to minimize or reduce the power consumption of the EVA system.

Various embodiments are described below of a valve actuator for addressing the above issues, as well as for providing other advantages. In one example, at least some of the above issues are addressed by utilizing permanent magnet (PM) material in unique arrangements so that the dF/dx, transition time and power consumption of the actuator are reduced, while the force capability of the actuator is increased.

Referring to FIG. 1, internal combustion engine 10 is shown. Engine 10 is an engine of a passenger vehicle or truck driven on roads by drivers. Engine 10 can coupled to torque converter via crankshaft 13. The torque converter can also coupled to transmission via a turbine shaft. The torque converter has a bypass clutch, which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission can also be coupled to tires via an axle. The tires interface the vehicle to the road.

Returning again to FIG. 1, internal combustion engine 10 comprising a plurality of cylinders, one cylinder of which, is shown. The engine is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry. In one example, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded, or to create vacuum to draw in recycled exhaust gas (EGR), or fuel vapors from a fuel vapor storage system having a valve controlling the amount of fuel vapors.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Also, in yet another alternative embodiment, intake valve 52 can be controlled via actuator 210, and exhaust valve 54 actuated by an overhead cam, or a pushrod activated cam. Further, the exhaust cam can have a hydraulic actuator to vary cam timing, known as variable cam timing.

In still another alternative embodiment, only some of the intake valves are electrically actuated, and other intake valves (and exhaust valves) are cam actuated.

Referring now to FIG. 2, a cross-section illustrating a valve actuator assembly for an intake or exhaust valve of an internal combustion engine is shown. Valve actuator assembly 210 includes an upper electromagnet 212 and a lower electromagnet 214. As used throughout this description, the terms "upper" and "lower" refer to positions relative to the combustion chamber or cylinder with "lower" designating components closer to the cylinder and "upper" referring to components axially farther from the corresponding cylinder. An armature 216 is fixed to, and extends outward from, an armature shaft 218, which extends axially through a bore in upper electromagnet 212 and lower electromagnet 214, guided by one or more bushings, represented generally by bushing 220. Armature shaft 218 is operatively associated with an engine valve 230 that includes a valve head 232 and valve stem 234. Depending upon the particular application and implementation, armature shaft 218 and valve stem 234 may be integrally formed such that armature 216 is fixed to valve stem 234. However, in the embodiment illustrated, shaft 218 and valve stem 234 are discrete, separately moveable components. This provides a small gap between shaft 218 and valve stem 234 when armature 216 is touching upper core 252. Various other connecting or coupling arrangements may be used to translate axial motion of armature 216 between upper and lower electromagnets 212, 214 to valve 230 to open and close valve 230 to selectively couple intake/exhaust passage 236 within an engine cylinder head 238 to a corresponding combustion chamber or cylinder (not shown).

Actuator assembly 210 also includes an upper spring 240 operatively associated with armature shaft 218 for biasing armature 216 toward a neutral position away from upper electromagnet 212, and a lower spring 242 operatively associated with valve stem 234 for biasing armature 216 toward a neutral position away from lower electromagnet 214.

Upper electromagnet 212 includes an associated upper coil 250 wound through two corresponding slots in upper core 252 encompassing armature shaft 218. One or more permanent magnets 254, 256 are positioned substantially between the slots of coil 250. The various orientations of the permanent magnet(s) are explained in greater detail with reference to FIGS. 4–20. As described, the various orientations provide for increased performance in various respects, without requiring additional actuator height and without reducing the available space for the coils (although each can be done, if desired).

Lower electromagnet 214 includes an associated lower coil 260 wound through two corresponding slots in lower core 262 encompassing armature shaft 218. One or more permanent magnets 264, 266 are positioned substantially between the slots of lower coil 60. As noted above, the various orientations of the permanent magnet(s) are explained in greater detail with reference to FIGS. 4–20.

One alternative arrangement would be to use permanent magnet material in only one of the two electromagnets, i.e., in either the upper electromagnet or the lower electromagnet.

During operation of actuator 210, the current in lower coil 260 is turned off or changed direction to close valve 230. Bottom spring 242 will push valve 230 upward. Upper coil 250 will be energized when armature 216 approaches upper core 252. The magnetic force generated by upper electromagnet 212 will hold armature 216, and therefore, valve 230 in the closed position. To open valve 230, the current in upper coil 250 is turned off or changed direction and upper spring 240 will push armature shaft 218 and valve 230 down. Lower coil 260 is then energized to hold valve 230 in the open position.

As will be appreciated by those of ordinary skill in the art, upper and lower electromagnets 212, 214 are preferably identical in construction and operation. However, upper and lower components of the actuator may employ different electromagnet constructions depending upon the particular application. Likewise, the approaches described may be used for either the upper or lower portion of the actuator with a conventional construction used for the other portion, although such asymmetrical construction may not provide the benefits or advantages to the same degree as a construction (symmetrical or asymmetrical) that uses the approaches herein.

As illustrated above, the electromechanically actuated valves in the engine can be designed to remain in the open or close position when the actuators are de-energized, with the armature held in place by the flux produced by the permanent magnet. The electromechanically actuated valves in the engine can also be designed to remain in the half open position when the actuators are de-energized. In this case, prior to engine combustion operation, each valve goes through an initialization cycle. During the initialization period, the actuators are pulsed with current, in a prescribed manner, to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) needs be energized at any time. Since the upper electromagnets hold the valves closed for the majority of each engine cycle, they are operated for a much higher percentage of time than that of the lower electromagnets.

One approach that can be used to control valve position includes position sensor feedback for potentially more accurate control of valve position. This can be used to improve overall position control, as well as valve landing, to possibly reduce noise and vibration.

Note that the above system is not limited to a dual coil actuator, but rather it can be used with other types of actuators. For example, the actuator 210 can be a single coil actuator.

Figure 4:
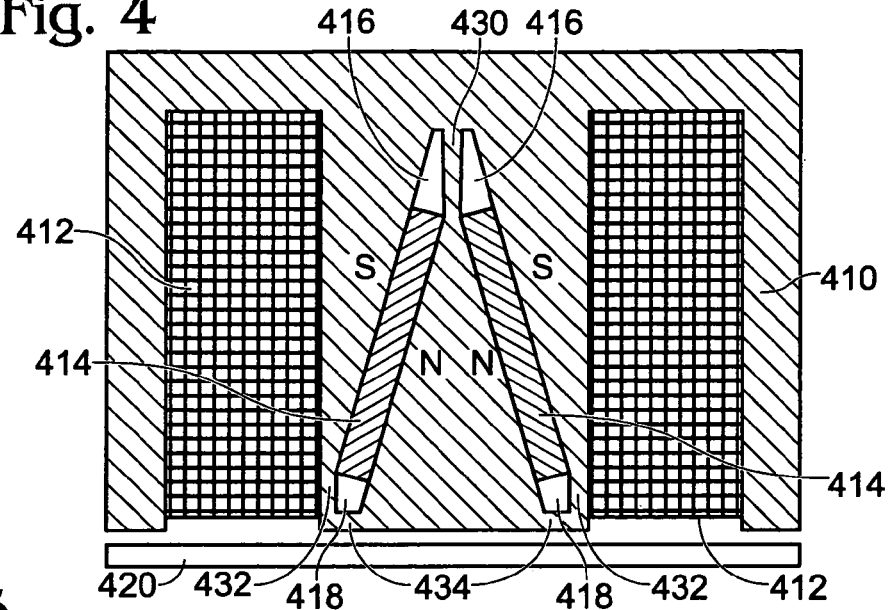
FIG. 4 is a cross-section illustrating an embodiment of a valve actuator.

FIG. 4 illustrates one embodiment of an improved actuator design. Note that FIG. 4 shows the system without an armature shaft (such as 218) for clarity. Specifically, FIG. 4 shows core 410 with coil 412. Further, an angled permanent magnet cross section 414 is shown having air gaps 416 and 418. In one example, the air gaps are adjacent to the permanent magnet, such as, for example, immediately adjacent the magnet with core material separating the coils from the air gap(s). Finally, armature 420 is also illustrated in FIG. 4. The inside surface of permanent magnet 414 is NORTH (N), while the exterior surface (facing the coil), is SOUTH (S). FIG. 4 shows a cross-sectional view of a rectangular or square actuator. Alternatively, the actuator could be round. In this cross-sectional view, the two magnet sections are of a linear, rectangular shape angled relative to the axial motion of the armature, with each section angled toward the center of the core across the height of the coil, with the outer ends toward the bottom of the core (armature side). As shown in Figures below, the orientation of the magnets could alternatively be that they come together near the armature side of the coils.

As a result, the inner core material is thinner between the interior of the coil and the exterior of the magnet sections at the armature side of the coil as compared with the opposite (upper) side. Likewise, the inner core material is thicker between the interior of the magnet sections at the armature side of the coil as compared with the opposite (upper) side.

Note also that multiple magnets could be used and also that the top air gap 416 could be eliminated. Also note that various other shapes can be used having at least a portion of the permanent magnet angled relative to the direction of motion of the armature.

As illustrated in FIG. 4, permanent magnet 414 is angled relative to the motion of armature 420. FIG. 4 shows an angle of approximately 30 degrees, although various other angles could be used, such as at or between 5–10, 5–20, 5–80, 10–20, 20–30, 30–40, 40–50, 50–60, 60–70, 70–80, or therebetween. Adjusting the angle varies the amount of improved operation, but also can affect the width of the actuator, and/or the amount of permanent magnet material utilized.

One advantageous feature of the embodiment of FIG. 4 is that the permanent magnets are arranged in such a manner so that the area of the permanent magnet surface contacting the core is larger than the center pole area facing the armature. As a result, the flux density in the center pole surface may be significantly higher than the flux density in the permanent magnet material's surface, which is limited by the permanent magnet material property. Further, since the magnetic force is proportional to the square of the flux density, this embodiment can increase (significantly in some examples) the force, without necessarily increasing the size of the actuator.

Further, by positioning a permanent magnet at an angle and/or at least partially between the slots of coil 412, it is possible to use more permanent magnet material, without requiring a larger (longer) actuator for a given specification. Further, more height is available for permanent magnet material than if the magnet was positioned below the coils, without requiring the overall height of the core to be increased. In other words, it is possible to get more magnetic material for a given height. By having greater magnetic material, it is possible to further increase the flux density in the core, thereby increasing the magnetic force for a given set of conditions.

Additionally, by positioning a permanent magnet at least partially between the slots of coil 412, this also enables more space for coil 412, thereby allowing more copper to be used in the coil, which can lower resistance and power loss, as well as heat generation. Thus, compared with approaches that place the permanent magnet below the coil, increased space is available to use as slot area for the coil. Therefore, for the same core height, prior approaches would have higher coil resistance because of the smaller slot area.

Additionally, the leakage flux produced by the permanent magnet 414 can be reduced by the placement of air-gaps as shown in FIG. 4. In one example, the upper air gaps 416 can be used to reduce flux leakage near the peak of the magnet, although these can be deleted in some cases. Likewise, the lower air gap 418 can also be used to reduce flux leakage, without requiring increased actuator height, although these can be deleted in some cases.

In one example, the material separating air-gap 416, termed bridge material 430, between gap 416, should be as thin as mechanically possible to reduce flux leakage. Likewise, for air-gaps 418, in one example, the bridge areas on the side 432 and bottom 434 are also designed to be as thin as mechanically possible.

Alternatively, air gap 416 (or 418) can be deleted to eliminate the leakage flux at that area, so that magnet 414 comes together in the cross sectional view at the peak.

Figure 5:
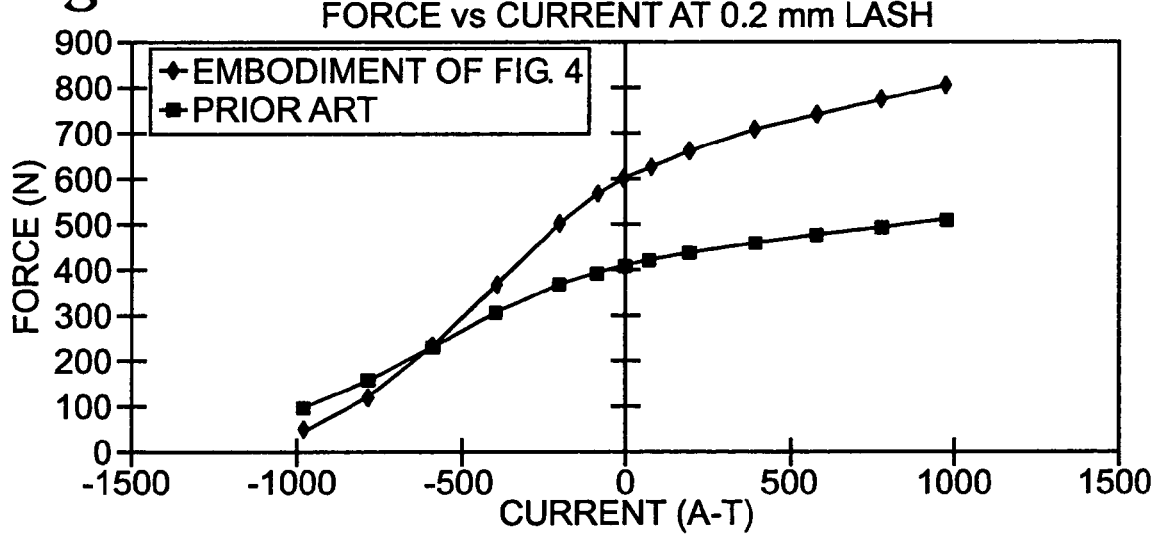
FIG. 5 is a graph showing magnetic force of an actuator as a function of the air gap for a prior art system compared with one example embodiment of the present disclosure.

FIG. 5 illustrates example improvements made by this embodiment over the permanent magnet actuator according to U.S. Pat. No. 4,829,947. It can be seen from FIG. 5 that the magnetic force is increased significantly when the current is positive. When the magnetic force needs to be reduced for armature release, the magnetic force of the actuator according to this embodiment is reduced faster than the previous permanent magnet actuator. Since the permanent magnet is in the path of the flux produced by the current, the actuator can have a low dF/dx and dF/di (rate of change of force with respect to changes in current), which can be beneficial for landing speed control. As a result of higher force for the same current, the actuator of this embodiment can enable the utilization of stronger springs to reduce the transition time and/or reduce current for the same force to reduce actuator power consumption, without requiring a larger actuator height.

As such, another advantage, with respect to prior designs, is that such an approach can achieve its benefits without requiring an increase in the actuator size (height).

FIG. 5 shows a force comparison of the above embodiment compared with a prior art approach using modeled results.

Various modifications can be made to the above embodiment, some of which are illustrated by the example alternative embodiments of FIGS. 6–20.

Figure 6:
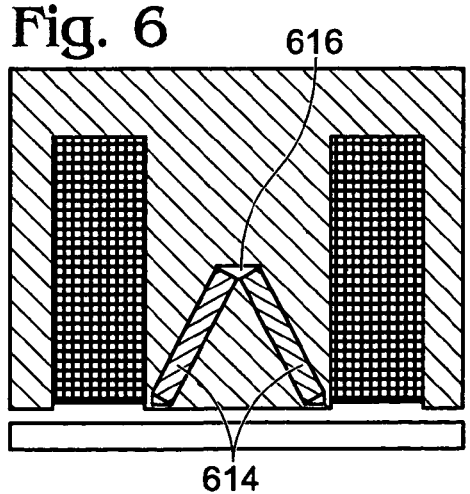

Referring now to FIG. 6, an alternative embodiment is shown where the permanent magnet 614 extends only along a portion of the height of the coil, and an alternative air gap 616 at the upper junction of the magnet is used. The remainder of the actuator is similar to FIG. 4. Such a configuration can be used to improve manufacturability in some cases.

Figure 7:
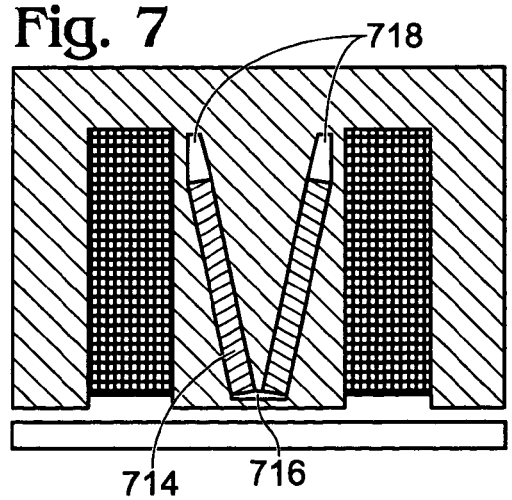

Referring now to FIG. 7, an alternative embodiment is shown where the orientation of permanent magnet 714 is rotated relative to that of FIG. 4, and an alternative air gap 716 at the lower junction of the magnet is used, along with the air gap 718 at the upper ends away from the armature side of the core. The remainder of the actuator is similar to FIG. 4.

Figure 8:
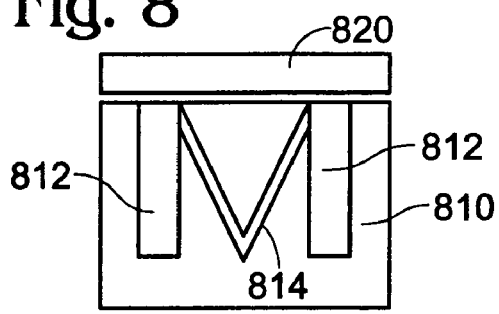

Still other alternatives are described below with regard to the schematic diagrams of FIGS. 8–21. FIG. 8 again illustrates an embodiment similar to FIG. 7, except that no air gaps are used, and a common permanent magnet 814 is used. Specifically, FIG. 8 shows core 810, coil 812, and armature 820, along with the permanent magnet 814.

Figure 9:
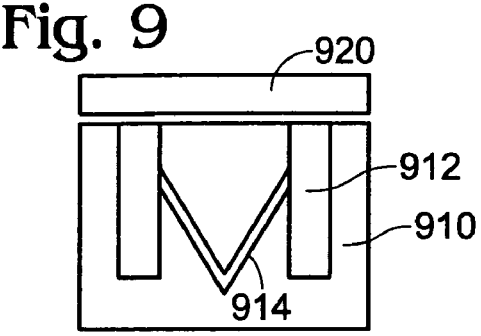

The permanent magnet can alternatively be placed at a lower position as shown by 914 in FIG. 9, extending past the coil on the non-armature side, to provide increased magnetic material to enhance actuator operation. FIG. 9 also shows that the outwardly extending ends of the conical permanent magnet end within the coil, although they could also extend to the end of the coil, or past the end of the coil. Further, FIG. 9 shows core 910, coil 912, and armature 920, along with the permanent magnet 914.

Figure 10:
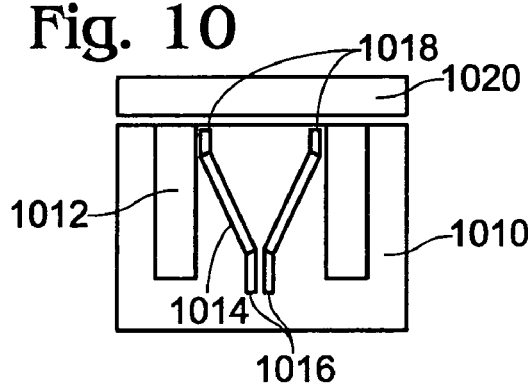

To improve manufacturability, bridges can be introduced to make the core a one-piece core, as shown in FIG. 10 (and also illustrated in other examples above). Holes 1016 and 1018 are also shown, which can be either filled with epoxy to improve the core integrity or left open for simpler manufacturing. Note also that any of the air gaps above and/or below can also be filled with epoxy. Further, FIG. 10 shows core 1010, coil 1012, and armature 1020, along with the permanent magnet 1014.

Figure 11:
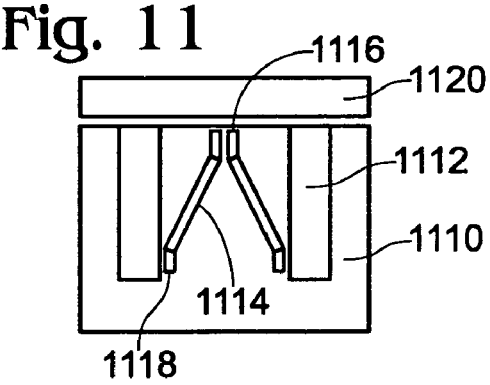

The permanent magnet in the above embodiments can also be flipped to create still other embodiments. FIG. 11 shows an example, which is a version based on FIG. 10 with the orientation of the magnet 1114 rotated by 180 degrees in the cross-sectional view compared with 1014, so that the magnet extends outwardly toward the non-armature end. Further, the Figure shows core 1110, coil 1112, and armature 1120, along with the permanent magnet 1114.

Figure 12:
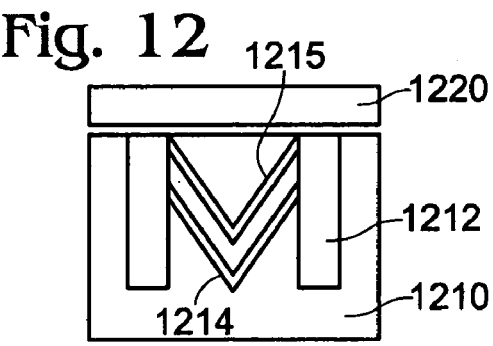

Further, one or more layers of permanent magnet material can be added to any of the above embodiments to create still other embodiments, as shown in FIG. 12. Specifically, FIG. 12 shows first permanent magnet layer 1214 and second layer 1215, both having at least a portion of the permanent magnet (or all of the permanent magnet) located between the slots of the coil. Alternatively, a portion could be positioned past the coils on the armature and/or non-armature side. Further, the Figure shows core 1210, coil 1212, and armature 1220. Also, air gaps could be added, if desired as shown in various other embodiments.

Figure 13:
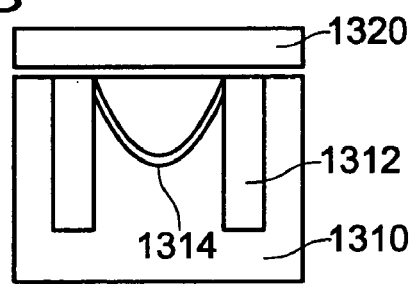

Also, the permanent magnet can have different shapes, while still providing some improved performance. FIG. 13 shows one example, while still providing at least some angled portions of the magnet relative to the axial motion of the armature. In this example, permanent magnet 1314 is shown with core 1310, coil 1312, and armature 1320. Permanent magnet 1314 has a U-shaped cross section, with the ends of the U toward the armature.

Figure 14:
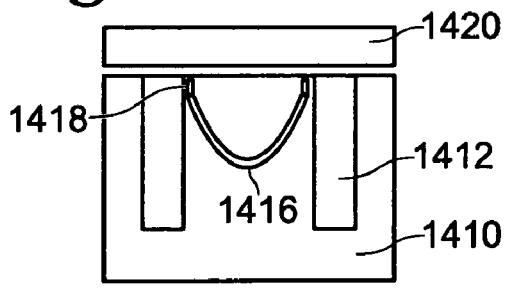

Also, FIG. 14 shows an embodiment with bridges introduced to the embodiment shown in FIG. 13, thereby illustrating that such bridges and air gaps can be used in any of the embodiments described herein. Specifically, air gaps 1418 are shown at the ends of the U of U-shaped permanent magnet 1416, along with core 1410, coil 1412, and armature 1420.

Figure 15:
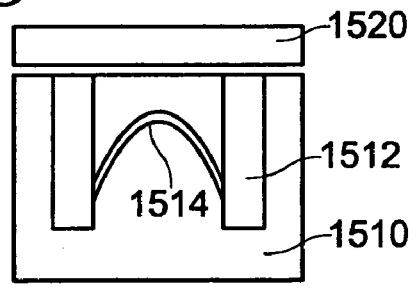

Further, FIGS. 15–16 show the embodiments based on the embodiment shown in FIGS. 13–14, with an alternative orientation of the permanent magnet (flipped). Specifically, FIG. 15 shows core 1510, coil 1512, and armature 1520 with inverted permanent magnet 1516 having the ends of the U-shaped cross section located away from the armature end. FIG. 16 shows core 1610, coil 1612, and armature 1620 with inverted permanent magnet 1616 having the ends of the U-shaped cross section located away from the armature end. Further, air gaps 1618 are also shown at the end of the U-shaped cross section of magnet 1616.

In still another alternative embodiment, the permanent magnet can be segmented as shown in FIG. 17, yet still have at least one permanent magnet located at least partially inside said coil and positioned at an angle relative to a direction of movement of an armature. Specifically, first permanent magnet segment 1714 is shown between the slots of coil 1712 and between the second permanent magnet segment 1715. Further, in one example, gaps 1716 and 1718 (or holes, or epoxy filled holes) can be positioned between the segments, and at the external ends of the segments. In this example, gap 1716 is located between segments 1714 and 1715, while gap 1716 is located between segment 1715 and coil 1712. Also, the figure shows armature 1720 and core 1710. By segmenting the permanent magnet, it can be possible to improve manufacturability, and more easily obtain alternative angles and different magnet segments, along with alternative cross-sectional shapes.

In the example of FIG. 17, segment 1715 is angled relative to the axial motion of armature 1720, while segment 1714 is located perpendicular to the axial motion of the armature 1720. Also, while the figure shows the segments fully contained within coil 1712, in an alternative embodiment segment 1715 can be only partially located within coil 1712, and segment 1714 located within coil 1712.

FIGS. 18–20 are still further variations based on the embodiment shown in FIG. 17, illustrating different orientations of the segmented permanent magnet at different locations within the coil. For example, FIG. 18 shows segments 1814 and 1815 located away from armature 1820 at the non-armature end of core 1810, while still between the slots of coil 1812. Further, air gaps 1816 and 1818 are also shown. FIG. 19 shows segments 1914 and 1915 located at the armature 1920 end of core 1910, while still between the slots of coil 1912. However, in FIG. 19, segment 1915 is inwardly angled away from armature 1920, whereas in FIGS. 17 and 18, segments 1815 and 1715 are both outwardly angled away from the armatures. FIG. 19 also shows gaps 1916 and 1918.

FIG. 20 is similar to that of FIG. 19, except shows an alternative location of segments 2014 and 2015 closer to a non-armature end of core 2010. FIG. 20 also shows coil 2012, armature 2020, along with air gaps 2016 and 2018.

FIG. 21 shows still another alternative embodiment illustrating that benefits can also be achieved over prior approaches without requiring permanent magnet to be located within the coil 2112, while still positioning the permanent magnet 2114 at an angle relative to the motion of armature 2120. Also, optional air gaps 2116 and 2118 at the inward and outward ends of the magnet, respectively, are also shown. The figure also illustrates the internal side is NORTH (N), while the external side of the magnet is SOUTH (S).

Such a configuration can be beneficial in that it can provide increased internal area for a through-shaft. In other words, because magnet 2114 has a cross section that avoids having a center area in the center of the core 2110, more area is available for the coil and/or shaft.

In still another embodiment, FIGS. 22–23 show examples where a one piece flat permanent magnet is used. Specifically, FIG. 22 shows core 2210, coil 2212, and armature 2220 having one piece flat permanent magnet 2214 in the center pole at an angle relative to the motion of armature 2220. Further, FIG. 22 shows the NORTH (N) and SOUTH (S) orientation of the magnet. The flat permanent magnet 2214 can be inserted into the center pole at various angles. In other words, the angle between the permanent magnet and the axis of the armature stem can be varied. Further, in one example, even at any angle, the two ends of the permanent magnet touch the inner side of the two slots for coil 2212.

FIG. 23 shows another embodiment similar to FIG. 22, except that one or two holes, (in this case, gaps 2316 and 2318) can be added to the one or both ends of the permanent magnet to form bridges that make the lamination of the core a one-piece lamination, thereby improving manufacturability. Specifically, FIG. 22 shows core 2310, coil 2312, and armature 2320 having one piece flat permanent magnet 2314 in the center pole at an angle-relative to the motion of armature 2320, with two air gaps 2316 and 2318.

As note above, the above configuration show various ways the configuration of the actuator can be changed. Each variation can be used with any other variation. For example, multiple layers of permanent magnet can be used in any of the shapes or configurations discussed above.

It will be appreciated that the configurations disclosed herein are exemplary in nature, and that these specific embodiments are not to be considered in a limiting sense, because numerous variations are possible. For example, the above actuator technology can be applied to V-6, I-4, I-6, V-12, opposed 4, and other engine types. Also, the approach described above is not specifically limited to a dual coil valve actuator. Rather, it could be applied to other forms of actuators, including ones that have only a single coil per valve actuator, The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
    a valve actuator coupled to a valve of an internal combustion engine, said valve actuator including at least one electromagnet having a coil wound about a core;
    at least one armature fixed to an armature shaft extending axially through the core and within said coil, and axially movable relative thereto, where an axis of said coil windings of said electromagnet is parallel to movement of said armature; and
    at least one permanent magnet extending at least partially into an interior portion of the coil, wherein the at least one permanent magnet is at least partially angled relative to axial movement of said shaft.

2. The system of claim 1 wherein the at least one permanent magnet is rectangular in shape.

3. The system of claim 1 wherein the at least one permanent magnet has a surface angled relative to axial movement of said shaft.

4. The system of claim 1 wherein the at least one permanent magnet has a cross-sectional V-shape.

5. The system of claim 1 wherein the at least one permanent magnet is substantially contained within said interior portion of the coil.

6. The system of claim 1 further comprising an air gap adjacent to said at least one permanent magnet, said air gap configured to reduce leakage flux produced by the permanent magnet.

7. The system of claim 6 wherein said core separates said coil from said air gap.

8. The system of claim 1 further comprising an air gap immediately adjacent to said at least one permanent magnet, said air gap configured to reduce leakage flux produced by the permanent magnet.

9. The system of claim 1 wherein the at least one permanent magnet has a cross-sectional shape with a peak on an opposite side from said armature, and two ends extending toward said armature at an angle.

10. A system comprising:
    a valve actuator comprising a pair of cores each having a wound coil located therein, each of said cores further having at least one permanent magnet located at least partially inside said respective coils and positioned at an angle relative to a direction of movement of an armature, where an axis of said coil windings of said electromagnet is parallel to movement of an armature, said actuator further comprising at least an air gap adjacent to said at least one permanent magnet, said air gap configured to reduce leakage flux produced by the permanent magnet; and
    a cylinder valve of an internal combustion engine coupled to said armature.

11. The system of claim 10 wherein said cylinder valve includes an intake valve.

12. The system of claim 11 further comprising a cam actuated exhaust valve of said internal combustion engine.

13. The system of claim 10 wherein said cylinder valve includes an exhaust valve.

14. A system comprising:
    a valve actuator coupled to a valve of an internal combustion engine, said actuator including a core having a wound coil located therein, said core further having at least one permanent magnet located at least partially below said coil and positioned at an angle relative to a direction of movement of an armature, with a first end of said permanent magnet being located closer to said coil than a second end of said permanent magnet, where said first end of said permanent magnet is closer to a center of said core than said second end of said permanent magnet and wherein said permanent magnet is located outside the center of said core.

15. A valve actuator for an internal combustion engine, comprising: a core having a wound coil located therein, said core further having at least one permanent magnet located at least partially below said coil and positioned at an angle relative to a direction of movement of an armature, with an inner part of said permanent magnet being located closer to said coil than an outer part of said permanent magnet, where said inner part of said permanent magnet is closer to a center of said core than said outer part of said permanent magnet, further comprising a first gap at said inner part of said permanent magnet and a second gap at said outer part of said permanent magnet.

16. The valve actuator of claim 15 wherein said permanent magnet is U-shaped.

17. A valve actuator for an internal combustion engine, comprising:

a core having a wound coil located therein, where an axis of said coil windings of said electromagnet is parallel to movement of an armature;

permanent magnet means for increasing magnetic flux in the actuator; and where said permanent magnet means is located at least partially within said coil and positioned at an angle relative to a direction of movement of an armature.

18. The valve actuator of claim 17 wherein said means for increasing magnetic flux in the actuator comprises at least one of a straight permanent magnet, a curved permanent magnet, a segmented permanent magnet, and a permanent magnet adjacent an air gap.

* * * * *